Patented Dec. 30, 1941

2,267,733

UNITED STATES PATENT OFFICE 2,267,733

ALCOHOLATE

Virgil L. Hansley, Niagara Falls, N. Y., assignor to E. I. du Pont de Nemours & Company, Wilmington, Del., a corporation of Delaware No Drawing. Application August 21, 1940, Serial No. 353,537

7 Claims. (Cl. 260—345)

This invention relates to the preparation of alcoholates. Particularly, it relates to a novel process for the production of alcoholates.

The most satisfactory method hitherto known for the preparation of alcoholates consists in reacting alcohols with metallic sodium. This reaction at times is slow and difficulty is usually encountered in obtaining a complete reaction. Furthermore, the prior art method requires the use of metallic sodium which is hazardous to handle, particularly when finely divided, and the operation of producing metallic sodium in a finely-divided state adds considerably to the time and expense of such a process. A further disadvantage in the use of a method requiring metallic sodium resides in the fact that this material possesses a strong reducing action which in some cases may cause the production of undesirable by-products. These disadvantages are particularly troublesome in large-scale operations.

It is an object of this invention to provide a new and improved method for the production of alcoholates. Another object of this invention is to provide a practical method for the production of the alcoholates of certain unsaturated alcohols. It is a further object of this invention to provide a method for the preparation of alcoholates which utilizes materials which are readily available in a form for direct use in the process. These and other objects will be apparent from the ensuing description of my invention.

These objects are attained in accordance with the present invention by reacting alcohols with alkali metal hydrides such as sodium hydride. This reaction may be illustrated by the following equation: $ROH + NaH \rightarrow RONa + H_2$.

It has been found that this reaction proceeds smoothly and rapidly and that a substantially complete reaction is readily obtained producing high yields of the desired alcoholate.

The alkali metal hydride which I prefer to use in carrying out the process of my invention is sodium hydride, since this material is easily prepared, is comparatively inexpensive and is available in a form suitable for use in this reaction.

Sodium hydride of suitable form and purity may be conveniently prepared according to the method described in U. S. Patent 1,958,012. The hydride obtained by this method is finely divided and has a purity of 99–100%. It is most conveniently handled as a powder moistened with the inert hydrocarbon in which it has been prepared. When finely divided sodium hydride is covered with an inert hydrocarbon such as kerosene, it is practically inert to the atmosphere and may be handled without danger of spontaneously igniting.

The use of sodium hydride for the preparation of alcoholates possesses definite advantages over a reaction requiring the use of metallic sodium. The reaction of alcohols with sodium hydride is smooth and the rate of reaction in general is much faster than that which takes place when sodium is used as one of the reactants. This factor is of particular importance in large-scale operations. Metallic sodium must be subdivided before use for efficient action, while sodium hydride is finely divided as prepared and can be preserved indefinitely when wet with the organic medium in which it is produced. The reaction product is more readily recovered when sodium hydride is utilized, since the reaction is substantially complete, whereas when metallic sodium is used, the metal usually becomes coated with reaction product which tends to prevent further reaction and this results in contamination of the product with metallic sodium which is difficult and troublesome to remove. The finely divided sodium hydride when moistened with benzene or kerosene is less hazardous to handle, less hygroscopic and more inert to constituents of the air than is metallic sodium in the same state of subdivision. Furthermore, the necessity for subdividing sodium before use adds considerably to the expense and time required and increases the hazards inherent in a process which requires the use of metallic sodium. A further serious disadvantage in the use of metallic sodium is due to the fact that this material is a comparatively strong reducing agent. This is an important factor, particularly when it is desired to prepare the alcoholates of unsaturated alcohols containing conjugate double bonds, since metallic sodium tends to reduce the double bond in such compounds and the desired product is not obtained. For this reason, many alcohols cannot be utilized in preparing alcoholates by means of a process which requires the use of metallic sodium. Sodium hydride, on the other hand, does not attack the double bond of these unsaturated alcohols and may, therefore, be used to prepare the alcoholate of any desired unsaturated alcohol.

The process of my invention is applicable to alcohols in general and is not restricted in scope to any particular group or class of alcohols. Illustrative of the alcohols known to produce satisfactory results are the primary, secondary, and tertiary aliphatic alcohols such as methyl, ethyl, isobutyl, cetyl, isopropyl, secondary butyl, tertiary butyl, and tertiary amyl alcohols; the polyhydroxy alcohols such as ethylene glycol, glycerol, and mannitol; the alicyclic monohydric alcohols such as cyclohexyl, fenchyl, menthyl and bornyl alcohols; the alicyclic polyhydric alcohols such as cyclohexanediol and cyclohexanetriol; the aliphatic unsaturated alcohols such as crotyl and geranyl alcohols; the aliphatic unsaturated polyhydric alcohols such as conylene glycol; the aromatic monohydric alcohols such as benzyl, xylenyl, salicyl and vanillyl alcohols; the aromatic polyhydric alcohols such as xylylene glycol and acenaphthylene glycol.

Further examples of alcohols which are useful in my process are the ether alcohols such as methoxy ethyl, methoxy propyl, and benzyoxy ethyl; amino alcohols such as the ethanol amines; ester alcohols such as ethylene glycol monoacetate and ethylene glycol monolinoleate.

Ketone alcohol such as diacetone alcohol and aldehyde alcohols such as glucose may also be utilized in preparing alcoholates according to the process of my invention.

While my invention is applicable to alcohols in general, I have found that my process is particularly valuable in the preparation of alcoholates of unsaturated alcohols containing conjugate double bonds which generally cannot be produced by reacting these alcohols with sodium. When sodium is reacted with alcohols of this type, the double bond may be attacked and the desired alcoholate not obtained. The alcoholates of compounds containing certain groups such as the carbonyl or nitrile groups, which are reduced by sodium and alcohol, may be prepared by my novel process since such groups are not affected by the alkali metal hydride and the alcoholates may therefore be prepared in the presence of these groups. Since certain groups such as the carbonyl group are not attacked by the alkali metal hydride it is possible, by utilizing my invention, to prepare alcoholates in the presence of compounds containing these groups without waste of the hydride and further contamination of the product.

The process of my invention is also of particular advantage in preparing the alcoholates of tertiary alcohols which in general react very slowly with metallic sodium, but which I have found react rapidly and completely with an alkali metal hydride such as sodium hydride.

Furthermore, my process is especially useful in the production of those alcoholates which are insoluble in the solvent medium used since the reaction is rapid and proceeds to completion without difficulty. The alcoholates of polyhydroxy alcohols also are readily prepared by means of my invention since utilization of the alkali metal hydride results in better control and complete reaction.

In practicing my invention, the sodium hydride may be added gradually to the alcohol in a suitable reaction vessel. The reaction vessel may be constructed of glass or, when the reaction is to be carried out on a large scale, the vessel may be constructed of steel or of any other suitable material. The reaction vessel is preferably equipped with a condenser to prevent loss of alcohol or other solvent which may be used in the process. It is also desirable to stir the reaction medium to provide good contact between the reactants.

The reaction between sodium hydride and alcohols is exothermic and it is generally unnecessary to supply heat. However, this may be done if desired. In the case of the lower boiling alcohols, the reaction may conveniently be carried out at the boiling point although the reaction vessel may be cooled if desired. The alcohol employed as one of the reactants may be utilized as the solvent medium for the reaction. However, when utilizing those alcohols which are either solids or viscous liquids at ordinary temperatures, it is advantageous to use an inert solvent as the reaction medium. For example, xylene, kerosene, ethers, and inert hydrocarbons in general may be advantageously used. Such a solvent may readily be removed from the reaction vessel by distillation, whereas when the higher boiling alcohols are used in excess, it becomes difficult to remove the alcohol from the reaction product. When the reaction is completed, the alcoholate may be recovered by evaporating the excess solvent and recovering the reaction product.

While I have stated that my novel reaction may be carried out at the boiling point when the lower alcohols are used, it will be obvious to those skilled in the art that any desired temperature compatible with the materials being used may be utilized, and my invention is, therefore, not restricted to reacting alcohols with an alkali metal hydride at any specified temperature.

The following examples illustrate the process of my invention:

*Example I*

Methanol (350 cc.) is placed in a three-necked flask fitted with stirrer and reflux condenser. Sodium hydride (2.2 moles) is placed in a small flask attached to one neck of the reaction flask by means of wide diameter rubber tubing closed with pinch clamps. The sodium hydride is admitted to the reaction flask with stirring over a period of 45 minutes, during which time the theoretical volume of hydrogen is evolved. A viscous solution of sodium methylate is obtained, which is suitable for use directly, or may be evaporated to obtain the product in solid form.

*Example II*

Using a procedure similar to that described in Example I, sodium hydride dissolves in ethanol to form a saturated solution of sodium ethylate containing the equivalent of 84 g. sodium per 1,000 g. solution at 15° C. A still more concentrated solution is readily obtained by the addition of more sodium hydride at a higher temperature.

*Example III*

Using apparatus similar to that described in Example 1, sodium hydride (12 g.) reacts with boiling tert-butyl alcohol (148 g.) in 30 minutes with theoretical hydrogen evolution. Sodium tert-butylate is precipitated as a finely divided white solid, and may be recovered in a pure form by filtration or evaporation.

*Example IV*

Under the conditions of the foregoing examples, sodium hydride reacts rapidly and smoothly with glycerol with the evolution of hydrogen. The resulting alcoholate is obtained as a viscous, colorless fluid.

When sodium metal is used in place of sodium hydride, under the conditions of Example I, the reaction becomes progressively slower as the concentration of sodium methylate increases and approximately eight hours are required for the reaction to reach completion. Similarly, it is observed that whereas soduim tertiary butylate as prepared in Example III required only thirty minutes for complete reaction, the reaction between tertiary butyl alcohol and metallic sodium is so slow as to be impractical for preparation of the alcoholate.

Many variations in the procedure for carrying out my novel reaction may be utilized without departing from the scope of my invention. For instance, the reaction may be carried out under an atmosphere of nitrogen or other inert gas to avoid oxidation of the alkali metal hydride. Generally, the hydrogen set free constitutes its own inert atmosphere. Various solvents compatible with the alkali metal hydride and the alcohol may be utilized. Many other modifications within the scope of my invention will be apparent to those skilled in the art.

The alcoholates obtained by the process of my invention are useful in the manufacture of various organic compounds and are particularly useful as condensing agents in organic syntheses.

It will be apparent to those skilled in the art that my invention possesses many important advantages over the processes of the prior art and that it is particularly valuable in that the disadvantages of the prior art methods are avoided. The process of my invention functions smoothly, rapidly, and completely, and high yields of the desired products are readily obtained. My process can be operated on any desired scale without difficuly. Furthermore, a major advantage in the process of my invention is that it provides a new method of obtaining the alcoholates of unsaturated alcohols and particularly those containing conjugate double bonds as well as tertiary alcohols and those alcohols containing groups such as the carbonyl and nitrile groups. These and other advantages will be apparent to those skilled in the art.

I claim:

1. A process for the production of alcoholates which comprises reacting sodium hydride with an alcohol.

2. A process for the production of alcoholates of unsaturated alcohols containing conjugate double bonds which comprises reacting sodium hydride with an unsaturated alcohol, said unsaturated alcohol containing conjugate double bonds.

3. A process for the production of the alcoholate of furfuryl alcohol which comprises reacting sodium hydride with furfuryl alcohol.

4. A process for the production of alcoholates of tertiary alcohols which comprises reacting sodium hydride with a tertiary alcohol.

5. A process for the production of sodium tertiary butylate which comprises reacting sodium hydride with tertiary butyl alcohol.

6. A process for the production of alcoholates of monohydric aliphatic alcohols which comprises reacting sodium hydride with a monohydric aliphatic alcohol.

7. A process for the production of sodium ethylate which comprises reacting sodium hydride with ethyl alcohol.

VIRGIL L. HANSLEY.